G. B. M. SPIGNO.
PROCESS FOR THE TREATMENT OF HIDES AND SKINS.
APPLICATION FILED AUG. 31, 1910.
1,090,799.
Patented Mar. 17, 1914.
2 SHEETS—SHEET 1.
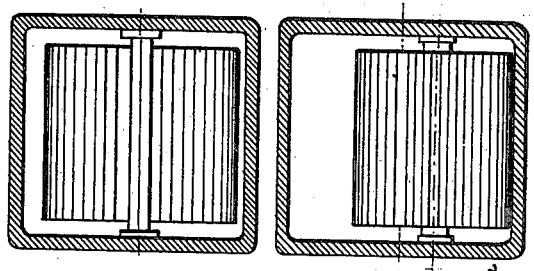
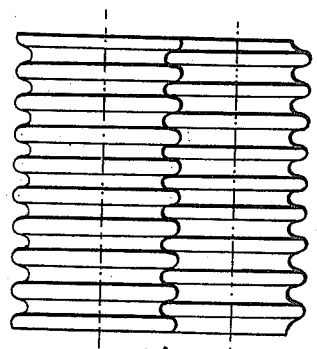
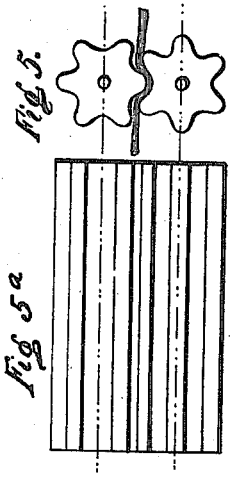
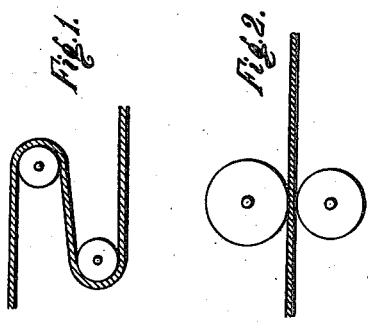
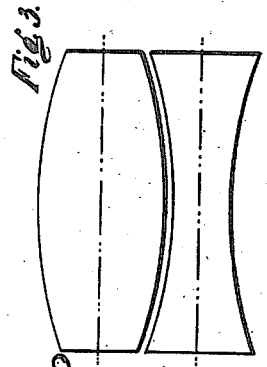
Witnesses:—
Ida F. Stanley.
E. R. Heine.
Inventor,
Giovanni Battista Mario Spigno.
By
His Attorneys G. B. M. SPIGNO.
PROCESS FOR THE TREATMENT OF HIDES AND SKINS.
APPLICATION FILED AUG. 31, 1910.
1,090,799.
Patented Mar. 17, 1914.
2 SHEETS—SHEET 2.
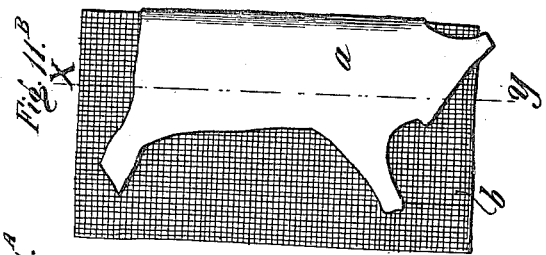
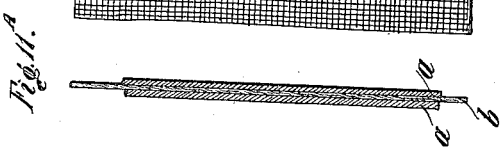
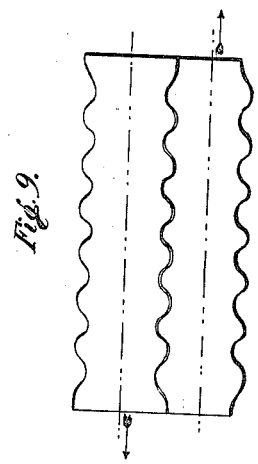
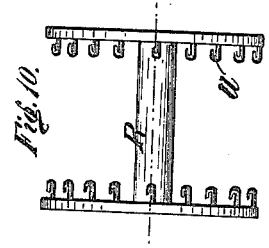
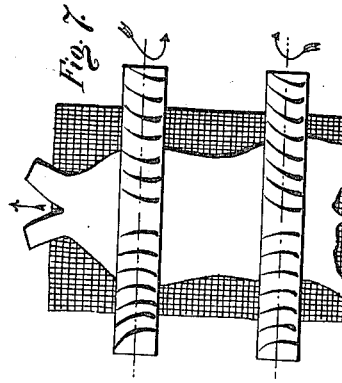
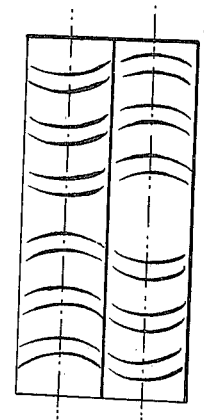
Witnesses:
Ida T. Stanley,
E. R. Heine.
Inventor.
Giovanni Battista Mario Spigno,
By
His Attorneys

UNITED STATES PATENT OFFICE.

GIOVANNI BATTISTA MARIO SPIGNO, OF GENOA, ITALY.

PROCESS FOR THE TREATMENT OF HIDES AND SKINS.

1,090,799.   Specification of Letters Patent.   Patented Mar. 17, 1914.

Application filed August 31, 1910. Serial No. 579,847.

*To all whom it may concern:*

Be it known that I, GIOVANNI BATTISTA MARIO SPIGNO, manufacturer, subject of the King of Italy, residing at No. 10 Via Monticelli, Genoa, in the Kingdom of Italy, have invented new and useful Improvements in Processes for the Treatment of Hides and Skins, of which the following is a specification.

The present invention concerns a process for the treatment of hides and skins, which have previously been unhaired and excarnated.

According to this process the hides or skins are sewn on or otherwise attached to wire gauzes, mesh webs or nets of metallic vegetable or animal stuffs, which nets are extensible; the skins may be fastened on bands or belts, of any of the above mentioned substances.

The annexed drawings show, by way of example only, some devices as employed for treating the skins according to the present process and Figure 1 is an end view of squeezing rollers; Fig. 2, an end view of pressing rollers; Fig. 3, a pair of conical drums; Fig. 4, a pair of grooved drums; Figs. 5 and 5ª, end views and elevation respectively of a pair of fluted drums; Fig. 6, a section of a rotary vat with a roller; Fig. 6ª, a similar view to Fig. 6 with the roller resting on the bottom; Fig. 7 shows a pair of oppositely rotating, stretching rollers; Fig. 8, a pair of helically grooved pressing rollers; Fig. 9, another kind of helically grooved pressing rollers; Fig. 10, a roller showing means for keeping the skins stretched while stored. Fig. 11ᴬ is a section along line X—Y of Fig. 11ᴮ and lastly Fig. 11ᴮ is a plan view of Fig. 11ᴬ, indicating a manner of securing the skins to the bands.

The hides or skins together with their supporting bands are subjected to the several operations either before passing through the usual tanning and dyeing baths, or while they are in the baths or after passing through them.

The mode of operation is substantially as follows: The hides or skins are for instance attached by sewing or by using appropriate clamps, to a hemp band whose width is sufficient to receive very large skins; and attention is given, when attaching the skins to their supports, that the skins will be put on lengthwise. The hides or skins are thereafter passed through the several usual baths, the band being preferably wound on rotary rollers, which are wide and large enough to receive the skins supporting band.

Besides being subjected to different chemical treatments both the skins and their supporting bands may be subjected to the mechanical operations hereinafter set forth: On winding the bands or belts on the roller, they may be stretched both in the longitudinal and the transverse directions. When once the band has been wound on the roller, the latter is caused to further revolve in a vat containing the tanning, dyeing or other liquor. The tanning liquor may also be poured on the revolving roller or forced through the hollow shaft thereof. The roller, with the band wound thereon, may also be mounted in a rotary vat, of any well known description, the axis of the roller being brought to coincide with the axis of revolution of the vat, a slot being provided in the side wall of the vat to allow of the band entering the vat therethrough. Said slot may be provided with a lid in order that it may be closed, even while the roller and the vat are revolving, when once the skins supporting band has been wound on the roller. Under such conditions the aforesaid operations may be performed with a reduced consumption of liquor.

It is not altogether necessary, though it may be advisable, to wind the skins supporting band on a roller, as said band may be stretched in a longitudinal, transverse or oblique direction, even without being wound on a roller as hereinbefore described.

By means of the devices diagrammatically shown in the accompanying drawings the skins, attached to their supporting bands, may be treated as follows: In order to squeeze out the liquor, the skins supporting bands may be led around rollers of very small diameter in opposite directions as shown in Fig. 1, with variable speed under variable tension and along paths of opposite and considerable curvatures. Coules of pressing rollers as shown in Fig. 2, through which the bands may be led, can be arranged at intervals along the path of the bands. Or the bands may be led through a pair of conical drums (Fig. 3) or through a pair of grooved drums, the projections of one drum entering the grooves of the other one as shown in Fig. 4; or longitudinally fluted rollers may also be employed, the bands moving in a direction perpendicular to the axis of the rollers (Fig. 5). Said drums or rollers may be made of any appropriate material and coated, with a lining, metallic or not. The grooves or flutes may also be helically wound on the surface of the rollers or drums.

Fig. 6 refers to the case of a roller, which together with the skins supporting band, is located inside a rotary vat. The roller has been removed from its bearing and laid down on the bottom of the vat, along the surface of which it receives motion in contact of the liquid, solid or gaseous reagent contained in the vat.

In order to submit the band and therefore the skins to a stress both in the longitudinal and transverse direction, it may be passed between pairs of rollers running in opposite directions as shown in Fig. 7.

Figs. 8 and 9 show pressing rollers, whose helical grooves are symmetrical with respect to the middle plane of each roller. According to the said helical grooves being right handed or left handed, a stretching or a pressing action, in the direction of the axis of revolution of the rollers, may be exerted on the bands and skins.

If the skins are fixed to a hemp belt the same is pressed by the aforesaid pressing rollers and the tanning liquor squeezed out by them may be recovered.

The band or belt may have been previously impregnated with substances (such as oil, tar and the like) which do not combine with the watery solutions. Moreover the bands may be passed through brushes or rollers, capable of conveying tanning liquors thereto.

All of the above or similar operations may be performed within air tight vessels impervious to light, into which gaseous, pulverous or liquid reagents may be introduced in finely subdivided form.

The same bands will also be availed of for conveying the skins to the adjacent premises. When, the band, with the skins attached thereto, is wound on a roller R (Fig. 10) the inside walls of the side disks thereof may be provided with hooks $u$, to which the edges of the band will have to be fastened in order to secure that a constant tension be kept up for a period of time.

When applying such rollers as hereinbefore described, the different treatments may be carried out, by successively introducing them into different vats or exposing the same to the action of sprays of liquid at very short intervals.

The band with the skins attached thereto may be caused to enter either cooled or heated chambers, or chambers filled with gases, capable of exerting any special action upon the solutions adhering to the bands or skins themselves.

The shape of the rollers along which the bands and the skins are caused to pass may be extremely different, owing to the irregular form of the skins and hides to be treated. Also the order in which the various rollers are to be successively employed will vary according to the circumstances.

As soon as the skins appear to be sufficiently tanned, they are removed from the belt or band. Should this take place too soon, before the tannage is completed, the same may still be proceeded with in an ordinary rotary vat or otherwise as heretofore in use.

In order to render the operation more speedy, several sets of winding rollers may be provided, while a much smaller number of working rollers will prove sufficient.

Under certain circumstances it will be useful to pass the bands, as well as the skins attached thereto, through solutions or powders, capable of acting upon the skins or upon the tanning substance as for instance discoloring salts, gelatins, dressing and filling substances.

Instead of sewing the skins or hides on the band or otherwise fastening the same thereto it may be advantageous to fold the skin $a$ (Fig. 11$^A$, Fig. 11$^B$ the former figure being a section on line $x\ y$ of Fig. 11$^B$) and enter the wire gauze band $b$ between the adjacent faces of said skin $a$, and to sew the skin on the band in the usual manner.

All the above refers not only to the tannage proper, but also to the liming, unhairing, softening and finishing processes.

The skins supporting band may consist of a mesh web of aluminium, copper or other metals not capable of soiling the skins and the liquids which come into contact therewith. Both the winding and the working rollers may be covered with felt so as to prevent the most delicate skins being spoiled by their contact.

In some cases it will be advisable to use metal or hemp bands capable of receiving only one skin, to mount the same on a movable frame and submit the latter to the above mentioned operations. Said operations may be carried out either in the open air or within closed receptacles of whatever size and shape, with tanning liquids of whatsoever description.

A layer of oil may be poured on top of the liquors in the vats through which the skin carrying bands are conveyed, in order to prevent the liquors from coming into contact with the air and becoming affected by the impurities in the atmosphere.

I claim—

1. The process of treating hides and skins consisting in attaching the hides and skins to extensible bands, and while so attached stretching said hides and skins and submitting them to tanning operations.

2. The process of treating hides which consists in attaching the hides to an extensible band and subjecting the band and the hide to flexing and stretching while undergoing tanning treatments.

3. The process of treating hides which consists in attaching the hide to an extensible band and subjecting band and hide to flexing and stretching in a plurality of directions while traveling and undergoing tanning and dyeing treatment.

4. The process of treating hides which consists in attaching the hide to an extensible band and subjecting the band and the hide to repeated flexing in the form of corrugations while traveling and undergoing tanning and dyeing treatments.

5. The process of treating hides which consists in attaching the hide to an extensible band and subjecting the band and the hide to repeated flexing in the form of corrugations ranging transversely of the direction of travel and to stretch said band with the hide while traveling and undergoing tanning and dyeing treatments.

6. The process of treating hides which consists in attaching the hide to an extensible band and subjecting the band and the hide to repeated flexing in the form of corrugations ranging longitudinally of the direction of travel and to stretch while traveling and undergoing tanning and dyeing treatments.

7. The process of treating hides which consists in attaching the hide to an extensible band and subjecting the band and the hide to repeated flexing in the form of corrugations ranging longitudinally and transversely of the direction of travel and to stretch while traveling and undergoing tanning and dyeing treatments.

8. The process of treating hides which consists in attaching the hide to an extensible band and subjecting the band and the hide to repeated flexing in the form of helical corrugations ranging transversely of the direction of travel and stretching while traveling and undergoing tanning and dyeing treatments.

9. The process of treating hides which consists in attaching the hide to an extensible band and subjecting the band and the hide to flexing and stretching between traveling surfaces while undergoing tanning and dyeing treatments.

10. The process of treating hides which consists in attaching the hide to an extensible band and subjecting the band and the hide to flexing and stretching while traveling in the plane of the hide, and while the hide is subjected to the action of tanning and dyeing liquids and maintaining the hide in its extended condition on the band while being treated.

11. The process of treating hides which consists in attaching the hide to an extensible band and subjecting the band and the hide to flexing and stretching while traveling in the plane of the hide and while the hide is subjected to the action of tanning and dyeing liquids; in subsequently removing said liquids from the hides by squeezing.

In testimony whereof I have signed my name to this specification in the presence of two subscribing witnesses.

GIOVANNI BATTISTA MARIO SPIGNO.

Witnesses:
BARTOLEMEO CARLO SALVOTTI,
CHAS. H. FISCHER.